(12) United States Patent
Feng et al.

(10) Patent No.: US 12,379,456 B2
(45) Date of Patent: Aug. 5, 2025

(54) SENSING AND COMMUNICATION INTEGRATED SYSTEM BASED ON MOBILE COMMUNICATION SIGNAL

(71) Applicant: BEIJING UNIVERSITY OF POSTS AND TELECOMMUNICATIONS, Beijing (CN)

(72) Inventors: Zhiyong Feng, Beijing (CN); Zixi Fang, Beijing (CN); Zhiqing Wei, Beijing (CN); Qixun Zhang, Beijing (CN); Hao Ma, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 371 days.

(21) Appl. No.: 18/003,764

(22) PCT Filed: Jul. 22, 2021

(86) PCT No.: PCT/CN2021/107830
§ 371 (c)(1),
(2) Date: Dec. 29, 2022

(87) PCT Pub. No.: WO2022/246998
PCT Pub. Date: Dec. 1, 2022

(65) Prior Publication Data
US 2023/0288528 A1  Sep. 14, 2023

(30) Foreign Application Priority Data

May 24, 2021  (CN) .......................... 202110566260.5

(51) Int. Cl.
*G01S 7/00* (2006.01)
*G01S 7/35* (2006.01)
(Continued)

(52) U.S. Cl.
CPC .............. *G01S 7/006* (2013.01); *G01S 7/356* (2021.05); *G01S 13/584* (2013.01); *G01S 13/86* (2013.01);
(Continued)

(58) Field of Classification Search
CPC ........ G01S 7/006; G01S 7/356; G01S 13/584; G01S 13/86; H04L 27/2605; H04L 27/2666
See application file for complete search history.

(56) References Cited

U.S. PATENT DOCUMENTS

| | | | |
|---|---|---|---|
| 10,575,272 B2 * | 2/2020 | Shin | H04W 56/0035 |
| 2011/0279305 A1 | 11/2011 | Lellouch et al. | |
| 2015/0016337 A1 * | 1/2015 | Chung | H04L 5/0012 370/328 |

FOREIGN PATENT DOCUMENTS

| CN | 101883069 A * | 11/2010 |
|---|---|---|
| CN | 109688082 A | 4/2019 |

(Continued)

OTHER PUBLICATIONS

Chen, R. et al., "Range and Velocity Estimation for DFRFT-OFDM-Based Joint Communication and Sensing Systems," 2019 IEEE 90th Vehicular Technology Conference (VTC2019-Fall), 2019, 5 pages.

(Continued)

*Primary Examiner* — Jessica L Laux
*Assistant Examiner* — Kimberly Jenkins
(74) *Attorney, Agent, or Firm* — Cozen O'Connor (57) ABSTRACT

The invention relates to an integrated sensing and communication system based on a mobile communication signal, belonging to the field of wireless communication. In this system, a synchronization sequence embedding module is added at a sending end of a node, which is configured for embedding a primary synchronization sequence and a secondary synchronization sequence into a radio frequency signal to be sent and then outputting the radio frequency signal to a digital modulation module; a primary synchronization sequence-assisted ranging accuracy improvement algorithm module and a secondary synchronization sequence-assisted speed measurement accuracy improvement algorithm module is newly added at a receiving end of a node; a target node range and a target node speed output (Continued)

by a two-dimensional range-Doppler radar processing algorithm module are compensated by using the autocorrelation characteristics of the primary/secondary synchronization sequences in a synchronization broadcast block to obtain more accurate target node range and target node speed. The invention effectively improves the sensing accuracy of the existing OFDM integrated system based on fixed frame structure, improves the accuracy of identifying the target node's motion information, and maximizes the sensing ability through flexible deployment of subcarriers to improve the node's own environmental adaptability.

9 Claims, 7 Drawing Sheets

(51) Int. Cl.
  *G01S 13/58*   (2006.01)
  *G01S 13/86*   (2006.01)
  *H04L 27/26*   (2006.01)

(52) U.S. Cl.
  CPC ...... *H04L 27/2605* (2013.01); *H04L 27/2666* (2013.01)

(56) References Cited

FOREIGN PATENT DOCUMENTS

| | | | |
|---|---|---|---|
| CN | 112751798 A | 5/2021 | |
| JP | 6559763 B2 * | 8/2019 | ........... H04B 7/2656 |
| WO | 2020118582 A1 | 6/2020 | |

OTHER PUBLICATIONS

Kumari, P. et al., "IEEE 802.11 ad-based Radar: An Approach to Joint Vehicular Communication-Radar System," IEEE Transactions on Vehicular Technology, vol. 67, Issue: 4, Apr. 2018, 15 pages.

Tian, X. et al., "Range and Velocity Estimation for OFDM-Based Radar-Radio Systems," 2017 9th International Conference on Wireless Communications and Signal Processing (WCSP), 2017, 6 pages.

* cited by examiner

SENSING AND COMMUNICATION INTEGRATED SYSTEM BASED ON MOBILE COMMUNICATION SIGNAL

TECHNICAL FIELD

The invention relates to an interdiscipline integrated technology in wireless communication field and radar field, in particular to an integrated sensing and communication system based on a mobile communication signal.

BACKGROUND

With the rapid development of communication technology, wireless communication and networking have been widely used, and the integrated sensing and communication design based on wireless communication technology system has gradually become an important research direction in the Internet of Things. As a bottleneck restricting the development of individual intelligence to group intelligence of nodes, the integrated system based on traditional radar signal system is restricted in performance, signal and other aspects, which has become a very difficult problem for researchers. At present, the fifth generation mobile communication technology (5G) is widely used in various fields, and 5G NR (5G New Radio) is the mainstream development architecture in the post-5G era. The integrated sensing and communication signal design based on 5G NR new waveform is paid more and more attention by people in the industry. Compared with the traditional radar and communication discrete design, the integrated sensing and communication design can improve the spectrum efficiency, reduce the energy consumption of intelligent nodes, and save the space and cost used by nodes.

At present, there is an integrated sensing and communication design scheme for individual node, and the feasibility of using a communication signal for sensing of individual nodes is verified. Specifically, some existing schemes proposed OFDM (Orthogonal Frequency Division Multiplexing) integrated system based on a fixed frame structure, which has advantages in signal processing flow and algorithm complexity, and relies on the two-dimensional range-Doppler radar processing algorithm based on Inverse/Fast Fourier Transform (IFFT/FFT), and the algorithm makes the multi-carrier orthogonal frequency division multiplexing data independent of the IFFT/FFT operation process, and hardly affects the acquisition of target information. In addition, multi-carrier OFDM has a high dynamic range, which can support the continuous tracking and measurement of a target node. However, with the improved requirements for sensing performance of a node in the Internet of Things, some problems in the traditional methods of the above-mentioned OFDM integrated system based on a fixed frame structure have gradually emerged, mainly as follows: (1) although the OFDM integrated system based on a fixed frame structure can realize the dual functions of sensing and communication, there are some defects such as poor flexibility and easy interference; (2) two-dimensional range-Doppler radar processing algorithm used in the OFDM integrated system based on a fixed frame structure takes symbol-subcarrier resource block as a minimum processing unit, the ranging accuracy of the system is limited by the number of subcarriers, and the speed measurement accuracy is limited by the number of symbols. Therefore, the detection accuracy of the integrated system will be limited to the length of two matrix elements before and after IFFT/FFT transformation, and there will be stepped errors in speed measurement and ranging, which cannot be eliminated by other means, thus causing the system unsuitable for large-scale node interconnection, which will also weaken the ranging ability and speed measurement ability of nodes to a target, resulting in errors in the acquired target motion information. In addition, the number of subcarriers and the number of OFDM symbols in the OFDM integrated system based on a fixed frame structure are fixed values, which cannot be changed or adjusted, thus restricting its application and popularization in the integrated sensing and communication technology.

The integrated sensing and communication design based on 5G NR is of great significance to realize multi-node interconnection. For example, in some complex environments, the reflected signals of individual nodes are easily interfered by the wireless environment in the surrounding, which leads to a sharp decline in their own sensing ability and endangers their own security. How to effectively improve the sensing performance of group and further ensure the normal sensing level of individual nodes has become an urgent problem to be solved. In addition, the previous integrated systems based on radar system are developed for a single node, with little communication data and fixed signal structure, so they rarely consider and cannot cope with the requirement for fast and flexible information interaction between multiple nodes.

SUMMARY

In order to meet the development needs of interconnection between nodes in the current Internet of Things, to solve the problems such as performance bottleneck of the current integrated sensing and communication signals between nodes and improvement of sensing accuracy, and solve the problem of degradation of sensing performance caused by the system limitation and algorithm limitation of the existing OFDM integrated system based on a fixed frame structure, the invention proposes an integrated sensing and communication system based on a mobile communication signal, so as to effectively improve the sensing performance and promote the level of information sharing between nodes.

The invention provides an integrated sensing and communication system based on a mobile communication signal, comprising:

a synchronization sequence embedding module provided at a sending end, which is configured for embedding a primary synchronization sequence and a secondary synchronization sequence into a radio frequency signal to be sent and then outputting the radio frequency signal to a digital modulation module, wherein, the synchronization sequence embedding module embeds a same primary synchronization sequence into a second CP-OFDM symbol and an eighth CP-OFDM symbol of one subframe, and embeds a same secondary synchronization sequence into a fourth CP-OFDM symbol and a tenth CP-OFDM symbol of one subframe; and CP-OFDM represents variable cyclic prefix orthogonal frequency division multiplexing;

a primary synchronization sequence-assisted ranging accuracy improvement algorithm module and a secondary synchronization sequence-assisted speed measurement accuracy improvement algorithm module provided at a receiving end, wherein a receiving sequence output by a parallel-to-serial conversion module at the receiving end is input into a two-dimensional range-Doppler radar processing algorithm module, the primary synchronization sequence-assisted ranging accuracy improvement algorithm module and the secondary synchronization sequence-assisted speed measurement accuracy improvement algorithm module respectively; and wherein the primary synchronization sequence-assisted ranging accuracy improvement algorithm module compensates for a target node range $Range_{OFDM}$ output by the two-dimensional range-Doppler radar processing algorithm module, and the secondary synchronization sequence-assisted speed measurement accuracy improvement algorithm module compensates for a target node speed $V_{OFDM}$ output by the two-dimensional range-Doppler radar processing algorithm module;

wherein the primary synchronization sequence-assisted ranging accuracy improvement algorithm module performs the following operations for N adjacent subframes in the receiving sequence respectively: performing an autocorrelation operation on a subframe in the receiving sequence and a corresponding subframe in a local sequence to calculate a corresponding target node range, where N≥2; calculating an average value of differences between the calculated N target node ranges $Range_u$ and the $Range_{OFDM}$ to obtain a compensation amount for ranging error ΔRange; compensating for the $Range_{OFDM}$; where u=1,2, ... N;

wherein the secondary synchronization sequence-assisted speed measurement accuracy improvement algorithm module performs the following operations for M adjacent subframes in the receiving sequence respectively: performing a correlation operation on a fourth CP-OFDM symbol and a tenth CP-OFDM symbol in a subframe to obtain a correlation result; obtaining a Doppler frequency shift $Doppler_v$ of a target node from the correlation result, where v=1,2, ... M, M≥2; calculating a Doppler frequency shift $Doppler_{OFDM}$ according to the target node speed $V_{OFDM}$ output by the two-dimensional range-Doppler radar processing algorithm module, and then calculating an average value of differences between M Doppler frequency shifts $Doppler_v$ and the $Doppler_{OFDM}$ to obtain a compensation amount for Doppler frequency shift error Δ Doppler compensating for the $Doppler_{OFDM}$; and calculating a compensated target node speed according to the compensated Doppler frequency shift.

In the system of the invention, the sending end also sets a subcarrier interval according to the range accuracy and speed accuracy required for measurement. According to the invention, a maximum ranging, range resolution, speed resolution and transmission rate corresponding to different subcarrier intervals are calculated in advance, and then the required subcarrier interval is searched according to requirements.

Compared with the prior art, the system in the invention has the advantages and positive effects as follows.

(1) The invention can effectively improve sensing accuracy of the existing OFDM integrated system based on a fixed frame structure. Compared with existing two-dimensional range-Doppler radar processing algorithm, the invention is essentially different in that: the existing two-dimensional range-Doppler radar processing algorithm takes a symbol-subcarrier resource block as a minimum operation unit, thus resulting in a stepped measurement error; the primary synchronization sequence-assisted ranging accuracy improvement algorithm module and the secondary synchronization sequence-assisted speed measurement accuracy improvement algorithm module based on the 5G NR synchronization broadcast block of the invention take a bit as a minimum operation unit, so that the measurement error generated by the existing two-dimensional range-Doppler radar processing algorithm can be effectively compensated.

(2) The invention can solve the problem of performance defects existing in signal design based on current OFDM integrated sensing and communication to some extent, and improve the accuracy of target motion information identification by using the auto-correlation characteristics of primary/secondary synchronization sequences in a synchronization broadcast block.

(3) The invention can maximize the sensing ability and improve the environmental adaptability of nodes through flexible deployment of subcarriers. Combining with the 5G NR standard, the system complexity and equipment redundancy can be reduced to the greatest extent, and simpler system processing can be realized, so that the invention can be applied to more B5G/6G potential application scenarios. Therefore, the invention has definite engineering practice significance.

DETAILED DESCRIPTION

The invention will be further explained in detail with reference to the drawings and embodiments.

For the research of integrated sensing and communication system, the existing research methods can be improved in three aspects. Firstly, based on 5G NR standard, the advantages of the signal system based on 5G technology can be maximized and the redundant hardware design can be reduced. Secondly, the physical layer frame structure based on the flexible and extensible 5G NR can be dynamically adjusted according to the real needs of nodes, thus enhancing the flexibility of sensing of a node to a target. Thirdly, special structures such as a synchronization broadcast block based on 5G NR standard have the potential ability to improve the measurement accuracy, thus improving the sensing accuracy of a node to a moving target. The object of the invention is to perform relevant signal design, algorithm design and performance analysis for the integrated sensing and communication system based on 5G NR, to provide a solution with better performance for the application of the integrated sensing and communication technology in the Internet of Things, and to provide a feasible signal processing basis for solving multi-node interconnection in practical engineering.

The integrated sensing and communication system based on 5G NR provided in the invention is mainly implemented by using the cyclic prefix orthogonal frequency division multiplexing (CP-OFDM) signal system defined by the 5G NR communication standard.

Figure 1:
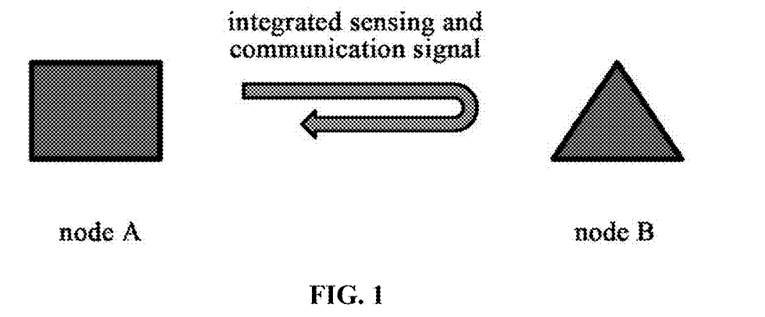
FIG. 1 is a schematic diagram of a use scenario of an integrated sensing and communication system based on 5G NR standard of the invention.

First, the application scenario of the invention will be explained. The integrated sensing and communication system based on 5G NR is applicable to the scenario of multi-node interconnection in the Internet of Things. FIG. 1 shows an example of an application scenario of integrated sensing and communication between two nodes. Node A and node B move on the same horizontal plane. Both nodes are equipped with integrated sensing and communication devices. Node A transmits an integrated sensing and communication signal. After receiving the signal, node B can obtain the communication information transmitted by node A through demodulation. At the same time, a reflected signal reflected by node B returns to node A, and node A acquires the motion information of node B by processing the reflected signal.

Figure 2:
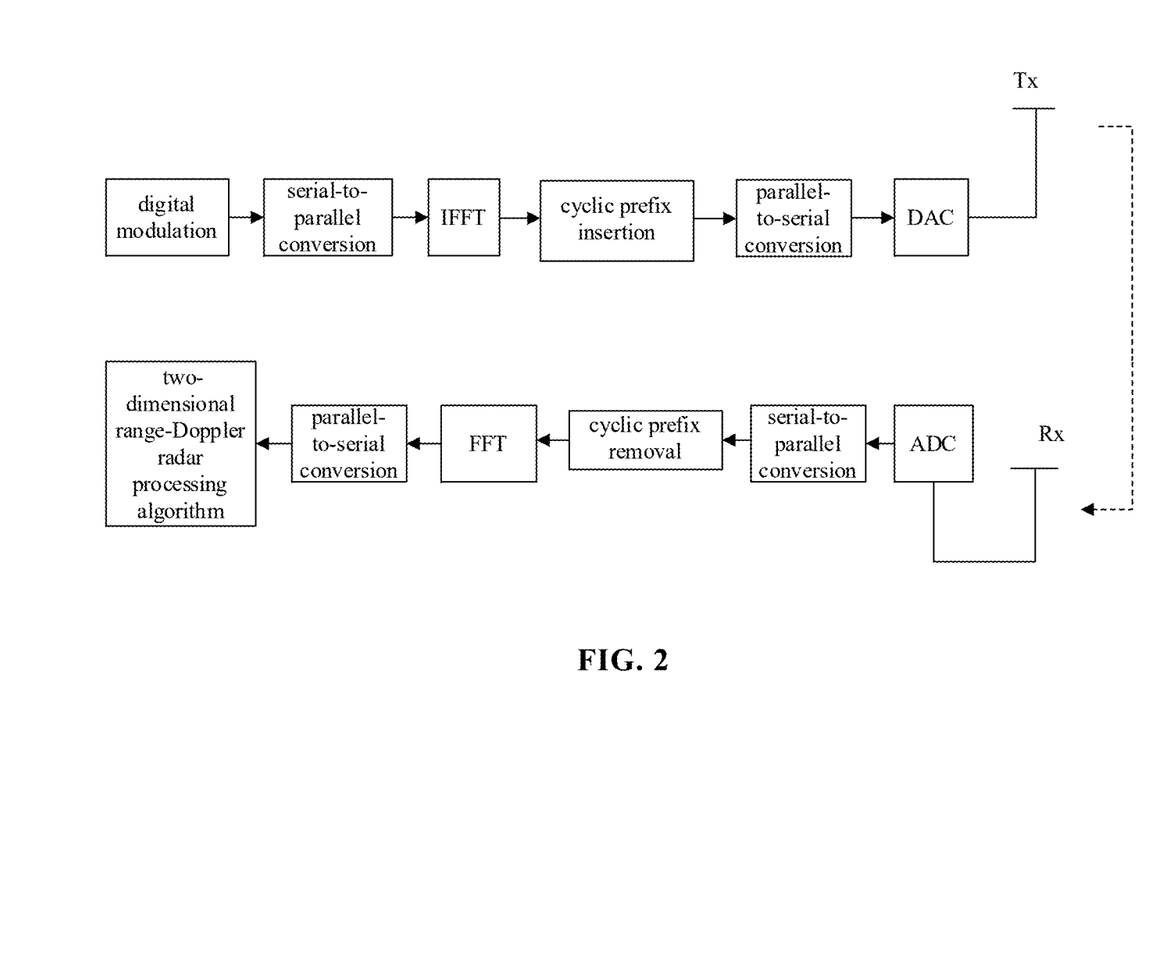
FIG. 2 is a schematic diagram of functional modules included in the existing integrated sensing and communication device.

The functional modules included in the existing integrated sensing and communication device are shown in FIG. 2. Each node has a receiving end Rx and a sending end Tx. The sending end Tx processes the frequency domain signal to be sent successively through a digital modulation module, a serial-to-parallel conversion module, an IFFT module, a cyclic prefix insertion module and a parallel-to-serial conversion module, and then sends the signal by a digital-to-analog conversion (DAC) module. The receiving end Rx performs processing by an analog-to-digital conversion (ADC) module, a serial-to-parallel conversion module, a cyclic prefix removal module, an FFT module and a parallel-to-serial conversion module, and then performs calculation on the acquired signal matrix containing the motion information of a target node by using the two-dimensional range-Doppler radar processing algorithm module, to obtain the range information and speed information of the target node.

The invention improves the existing integrated sensing and communication device, and the integrated sensing and communication signal is processed based on 5G NR standard. First, the performance analysis of the integrated sensing and communication system under parameters of 5G NR standard will be explained. This part is the theoretical basis of improving the design of integrated sensing and communication system.

Performance analysis of integrated sensing and communication system is performed under parameters of 5G NR standard. According to the invention, the sensing performance and communication performance of the integrated sensing and communication system are analyzed within the framework of the existing 5G NR standard. As shown in the following Table 1, the calculated theoretical performance values of the integrated sensing and communication signal under different parameter configurations of 5G NR standard are calculated. The calculated parameter values provide the basis for setting simulation parameters for algorithm used for improvement of sensing performance of the integrated signal based on a 5G NR synchronization broadcast block provided by the invention. The existing 5G NR standards referred are 3GPP Release-16 TS 38.913 and TS 38.211.

TABLE 1 the calculated theoretical performance values of the integrated sensing and communication signal under different parameter configurations of 5G NR standard

| subcarrier interval | 15 kHz | 30 kHz | 60 kHz | 60 kHz (extended) | 120 kHz | 240 kHz |
|---|---|---|---|---|---|---|
| Bandwidth (MHz) | 20 | 40 | 100 | 100 | 400 | 400 |
| CP-OFDM symbol length ($\mu s$) | 71.36 | 35.67 | 17.84 | 20.8 | 8.90 | 4.46 |
| Length of CP ($\mu s$) | 4.69 | 2.34 | 1.17 | 1.36 | 0.57 | 0.29 |
| Number of symbols | 140 | 280 | 560 | 480 | 1120 | 2240 |
| Number of subcarriers | 1333 | 1333 | 1667 | 1667 | 3333 | 1667 |
| Maximum ranging (m) | 700 | 350 | 175 | 200 | 85 | 43.5 |
| range resolution (m) | 7.5 | 3.75 | 1.5 | 1.5 | 0.375 | 0.375 |
| Speed resolution (m/s) | 2.54 (5.9 GHz) | 2.54 (5.9 GHz) | 2.54 (5.9 GHz) | 2.54 (5.9 GHz) | 0.627 (24 GHz) | 0.627 (24 GHz) |
| Transmission rate (bit/s) 256QAM | 149M | 298M | 746M | 640M | 2986M | 2986M |

The sensing performance corresponding to different subcarrier interval and different number of CP-OFDM symbol under 5G NR standard can be queried through Table 1, thus providing theoretical reference and basis for engineering practice.

In Table 1, the six subcarrier intervals and the bandwidth, the CP-OFDM symbol length, the length of CP, the number of symbols and the number of subcarriers corresponding to the six subcarrier intervals are defined by Release-16 TS 38.913 and TS 38.211 standards of 5G NR standardization organization 3GPP. References are as follows:

[1]3GPP. TS 38.913 Study on scenarios and requirements for next generation access technologies [S]. 3GPP, 2017.

[2]3GPP. TS 38.211 NR; Physical channels and modulation[S]. 3GPP, 2021.

The parameters in Table 1, i.e., the maximum ranging, range resolution, speed resolution and transmission rate are calculated according to different subcarrier interval setting. Transmission rate is the communication transmission rate when the modulation mode is 256QAM (quadrature amplitude modulation). The center frequency of the signal corresponding to the subcarrier interval of 15 kHz, 30 kHz and 60 kHz is 5.9 GHz, and the center frequency of the signal corresponding to the subcarrier interval of 120 kHz and 240 kHz is 24 GHz. The speed resolution can be calculated by combining the center frequency and subcarrier interval. As shown in Table 1, the first speed resolution of 2.54 m/s (5.9 GHz) is the speed resolution when the subcarrier interval is 15 kHz and the center frequency is 5.9 GHz.

The improved integrated sensing and communication system of the invention is explained below, which mainly includes two parts. In one part, the radio frequency signal input to the digital modulation module is improved at a sending end. In the other part, a primary synchronization sequence-assisted ranging accuracy improvement algorithm module and a secondary synchronization sequence-assisted speed measurement accuracy improvement algorithm module are added at a receiving end. In the following, these two parts are explained respectively.

(I) According to the invention, the radio frequency signal input to the digital modulation module is improved at the sending end.

The integrated sensing and communication signal $s_{TX}(t)$ based on 5G NR standard can be expressed as:

$$s_{TX}(t) = \sum_{m=0}^{M_s-1} \sum_{m=0}^{N_c-1} d_{TX}(m, n)\exp(j2\pi n\Delta ft)rect\left(\frac{t - mT_s}{T_s}\right)$$

Where t represents moment, and the initial timing is set to moment 0; $M_s$ is the number of CP-OFDM symbols and $N_c$ is the number of CP-OFDM subcarriers; $\Delta f$ represents the subcarrier interval, and $T_s$ represents the duration of a complete CP-OFDM symbol, and $$\Delta f = \frac{1}{T_s}; d_{TX}(\cdot)$$

represents data in a symbol-subcarrier resource block; j represents imaginary unit; rect(•) is a rectangular window function, which is defined as follows:

$$rect(x) = \begin{cases} 0, & 0 < x < 1 \\ 1, & \text{other} \end{cases}$$

Figure 3:
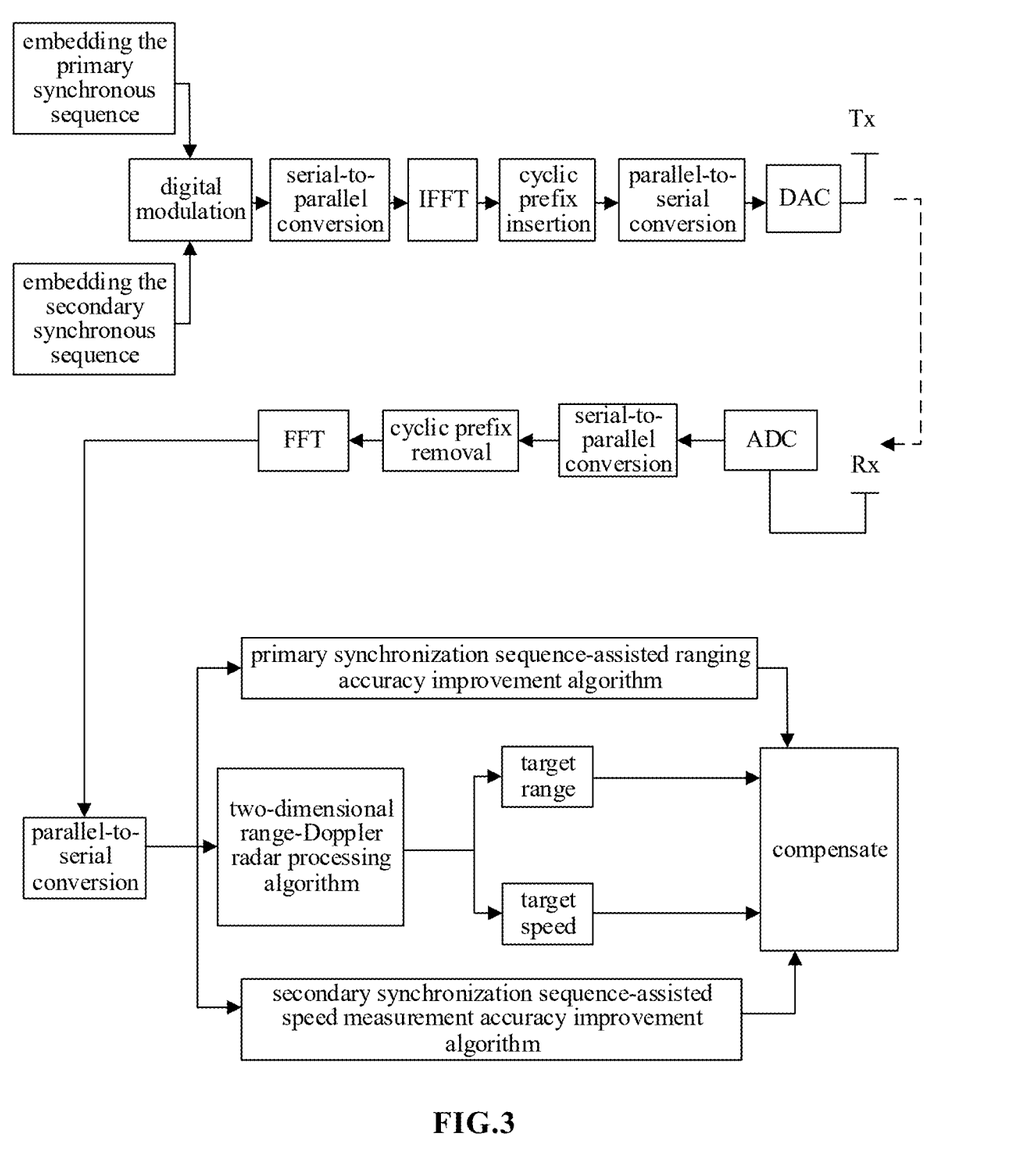
FIG. 3 is a schematic frame diagram of integrated sensing and communication signal processing based on 5G NR standard of the invention.

In the integrated sensing and communication system based on 5G NR of the invention, the signal processing frame of the integrated sensing and communication based on 5G NR standard is shown in FIG. 3, and includes the following.

Firstly, a synchronization sequence embedding module is provided, and a primary synchronization sequence and a secondary synchronization sequence is embedded into a radio frequency signal to be sent based on 5G NR standard. The primary synchronization sequence consists of an m-sequence with a period of 127 bits, and the secondary synchronization sequence consists of a Gold sequence generated by two m-sequence optimum pairs each with a period of 127 bits. Referring to the standard that the subcarrier interval is 30 kHz (mode 2) specified by 5G NR standard, the sending end Tx of node A embeds the primary synchronization sequence into a second CP-OFDM symbol and an eighth CP-OFDM symbol of one subframe, and embeds a secondary synchronization sequence into a fourth CP-OFDM symbol and a tenth CP-OFDM symbol of one subframe. After that, digital modulation, serial-to-parallel conversion, IFFT, cyclic prefix insertion and parallel-to-serial conversion are performed on a frequency domain signal embedded in the synchronization sequence, and then the signal is transmitted through digital-to-analog conversion (DAC). The receiving end Rx of the node A further obtains the range information and speed information of a target node by processing the obtained signal matrix containing the motion information of the target node by a two-dimensional range-Doppler radar processing algorithm module through the operations of analog-to-digital conversion (ADC), serial-to-parallel conversion, cyclic prefix removal, FFT and parallel-to-serial conversion and so on. At this time, the receiving end compensates for the target range information and the target speed information obtained by the two-dimensional range-Doppler radar processing algorithm module through the added primary synchronization sequence-assisted ranging accuracy improvement algorithm module and the secondary synchronization sequence-assisted speed measurement accuracy improvement algorithm module and by using the good autocorrelation characteristics and regularity of the embedding position of the primary synchronization sequence and the secondary synchronization sequence, thus improving the measurement accuracy of the whole system.

(II) The primary synchronization sequence-assisted ranging accuracy improvement algorithm module and the secondary synchronization sequence-assisted speed measurement accuracy improvement algorithm module are added at the receiving end of the node by using the autocorrelation characteristics of the primary/secondary synchronization sequences in the 5G NR synchronization broadcast block and the regularity of the embedded positions of the primary/secondary synchronization sequences. As shown in FIG. 3, reflected signal sequence of the target node output by the parallel-serial conversion module of the receiving end Rx, that is, the receiving sequence, is input into the two-dimensional range-Doppler radar processing algorithm module, the primary synchronization sequence-assisted ranging accuracy improvement algorithm module, and the secondary synchronization sequence-assisted speed measurement accuracy improvement algorithm module respectively. The target node range $\text{Range}_{OFDM}$ and the target node speed $V_{OFDM}$ are calculated and output by the two-dimensional range-Doppler radar processing algorithm module, and the corresponding Doppler frequency shift $\text{Doppler}_{OFDM}$ can be calculated from $V_{OFDM}$. In the following, the functional implementation of the two new modules are described respectively.

(1) The target node range obtained by the two-dimensional range-Doppler radar processing algorithm module is compensated by using the primary synchronization sequence-assisted ranging accuracy improvement algorithm module.

The primary synchronization sequence-assisted ranging accuracy improvement algorithm module executes the following processing steps (11) to (13).

(11) The autocorrelation between the receiving sequence and the local sequence is performed, and a time delay and the target node range is calculated by using the autocorrelation function. In the embodiment of the invention, the corresponding time delay $\text{Delay}_u$ and the relative range $\text{Range}_u$ between the current node and the target node are calculated according to a subframe of the receiving sequence and a subframe of the local sequence which have two identical and adjacent primary synchronization sequences, u is 1 and 2.

Within the 10 ms wireless frame sent by the sending end, each subframe is configured to contain two identical primary synchronization sequences. In the embodiment of the invention, a 10 ms wireless frame contains 10 subframes of 1 ms, and each subframe contains two identical primary synchronization sequences and two identical secondary synchronization sequences.

The local sequence is the radio frequency signal sent by this node and embedded in the synchronous sequence. It is assumed that two adjacent subframes $f_1$ and $f_2$ in the receiving sequence each have two identical primary synchronization sequences Squence_A and Squence_B and two subframes $F_1$ and $F_2$ each having two primary synchronization sequences Squence_A and Squence_B are searched in the local sequence. Then autocorrelation between the sequences of subframes $f_1$ and $F_1$ is performed, the peak value of correlation peak is searched, and a corresponding time delay $Delay_1$ and the target node range $Range_1$ is calculated; autocorrelation between the sequences of subframes $f_2$ and $F_2$ is performed, the peak value of correlation peak is searched, and the corresponding time delay $Delay_2$ and the range of the target node $Range_2$ is calculated.

In this step, at least the autocorrelation between two adjacent subframes in the receiving sequence and the corresponding subframes in the local sequence is calculated to obtain at least two target node ranges, that is, u=1,2, ... N, N≥2.

Performing autocorrelation between the sequences to calculate the time delay and the target node range are the prior art, which will not be repeated in the present invention.

(12) The average value of differences between $Range_u$ and the range $Range_{OFDM}$ obtained from the two-dimensional range-Doppler radar processing algorithm module is calculated as a compensation amount for ranging error Δ Range, i.e.

$$\Delta Range = E(Range_u - Range_{OFDM});$$

Where E(•) means average.

(13) The real target node range after compensation is calculated.

(2) The target node speed obtained by the two-dimensional range-Doppler radar processing algorithm module is compensated by using the secondary synchronization sequence-assisted speed measurement accuracy improvement algorithm module.

The secondary synchronization sequence-assisted speed measurement accuracy improvement algorithm module executes the following processes (21) to (25): (21) performing a correlation operation on a fourth CP-OFDM symbol and a tenth CP-OFDM symbol in the first subframe of the receiving sequence to obtain a correlation result $C_{acor}^1$; performing a correlation operation on a fourth CP-OFDM symbol and a tenth CP-OFDM symbol in the second subframe of the receiving sequence to obtain a correlation result $C_{acor}^2$; (22) searching peak point phases corresponding to $C_{acor}^1$ and $C_{acor}^2$ respectively, and calculating the Doppler frequency shifts $Doppler_1$ and $Doppler_2$ of the target node measured by two adjacent subframes respectively;

In the embodiment of the invention, the correlation operation is performed on two adjacent subframes in the receiving sequence respectively. In practical application, the correlation operation can also be performed on a plurality of adjacent subframes in the receiving sequence to obtain a plurality of correlation results $C_{acor}^v$, where v=1,2, ... M, M≥2.

(23) calculating an average value of differences between $Doppler_1$, $Doppler_2$ and Doppler frequency shift $Doppler_{OFDM}$ obtained by the two-dimensional range-Doppler radar processing algorithm module respectively as the compensation amount for error, i.e.

$$\Delta Doppler = E(Doppler_v - Doppler_{OFDM});$$

In the embodiment of the invention, v=1, 2.

(24) calculating a real Doppler frequency shift of the target node after compensation: $Doppler_{real} = Doppler_{OFDM} + \Delta Doppler$;

(25) calculating a real speed of the target node after compensation, i.e.

$$V_{real} = \frac{f_c Doppler_{real}}{2}$$

Where $f_c$ represents the center frequency of the signal.

In order to further reflect the innovation of the invention, the system-level simulation test results obtained by using Matlab simulation software are given below, and the simulation is also compared with the existing two-dimensional range-Doppler radar processing algorithm.

Figure 4:
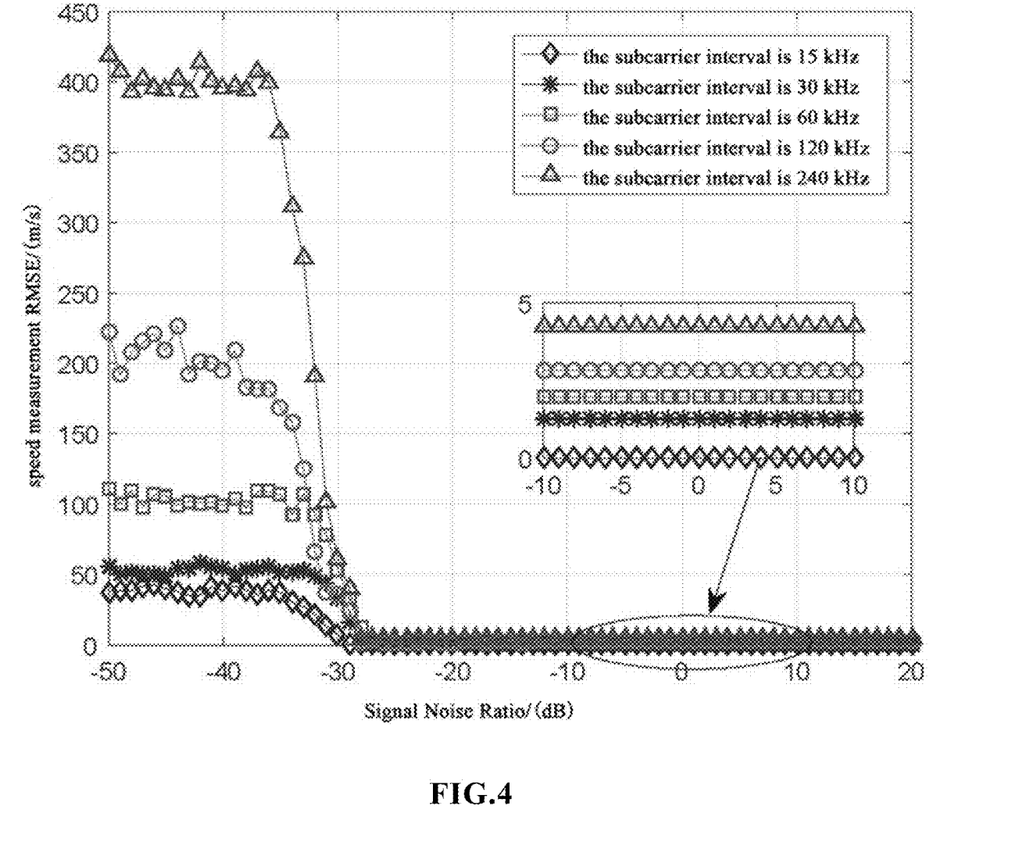
FIG. 4 is a schematic diagram of root mean square error of CP-OFDM integrated signal speed measurement with different subcarrier intervals in a test of the invention.
Figure 5:
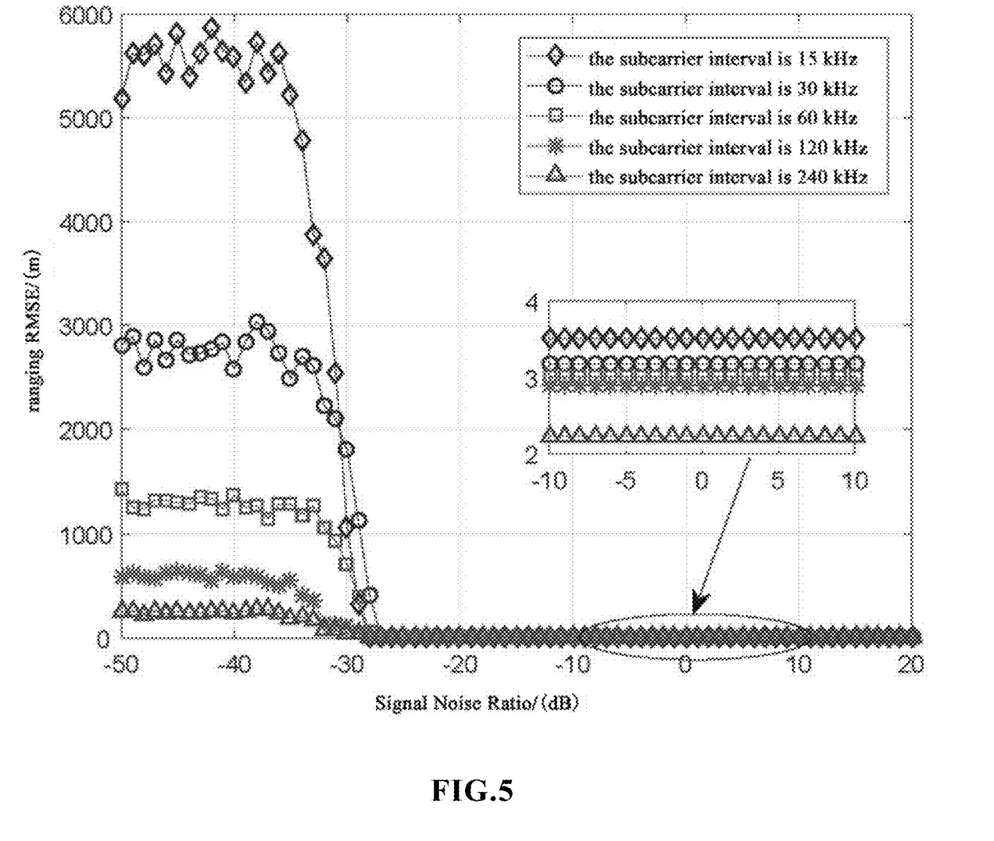
FIG. 5 is a schematic diagram of root mean square error of CP-OFDM integrated signal ranging with different subcarrier intervals in a test of the invention.

Firstly, the Root Mean Squared Errors (RMSE) of speed measurement and ranging of CP-OFDM integrated signal with different subcarrier intervals are shown in FIG. 4 and FIG. 5 respectively. As can be seen from FIG. 4, with the increase of subcarrier interval, the RMSE of speed measurement of CP-OFDM integrated signal gradually increases. This is because the increase of subcarrier interval will reduce the duration of CP-OFDM symbols and increase the minimum speed unit that can be recognized by the system, thus increasing the speed measurement error. At the same time, it can be seen that with the increase of Signal Noise Ratio (SNR), the RMSE of speed measurement of each subcarrier interval gradually decreases and tends to be stable. However, the trend of increase of RMSE of speed measurement caused by the increase of subcarrier interval is still obvious. Without considering the communication transmission rate, the smaller the subcarrier interval is, the more accurate the speed measurement of node A to node B is. It can be seen from FIG. 5 that with the increase of subcarrier interval, RMSE of ranging of CP-OFDM integrated signal gradually decreases. This is because the increase of subcarrier interval reduces the minimum range unit that can be recognized by the system, thus improving the ranging accuracy. At the same time, it can be seen that with the increase of signal-to-noise ratio, the RMSE of ranging of each subcarrier interval gradually decreases and tends to be stable, but the trend of decrease of ranging error caused by the increase of subcarrier interval is still obvious. Without considering the communication transmission rate, the larger the subcarrier interval is, the more accurate the ranging of node A to node B is. Therefore, the flexible allocation of subcarrier interval can meet the sensing requirements of different target nodes. When the system of the invention is applied, it is suggested to configure a smaller subcarrier interval in engineering practice to meet the requirement of high speed measurement accuracy, and configure a larger subcarrier interval in engineering practice to meet the requirement of high ranging accuracy.

Figure 6:
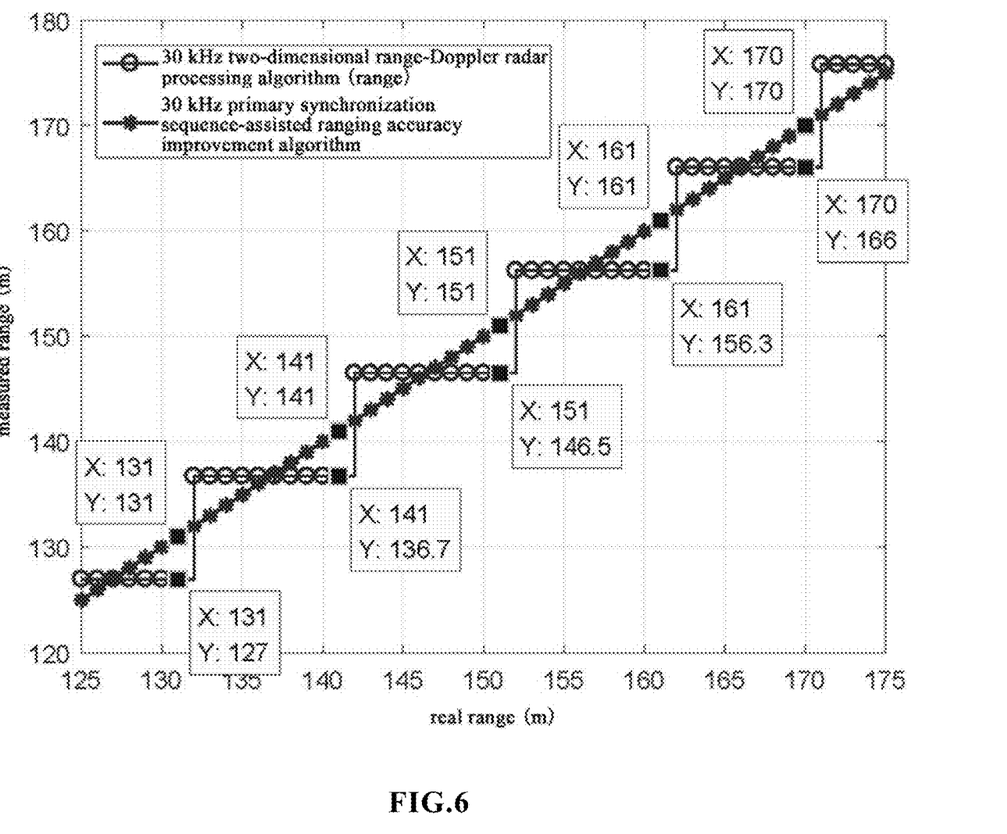
FIG. 6 is a comparison diagram of the ranging error when subcarrier interval is 30 kHz in a test of the present invention.
Figure 7:
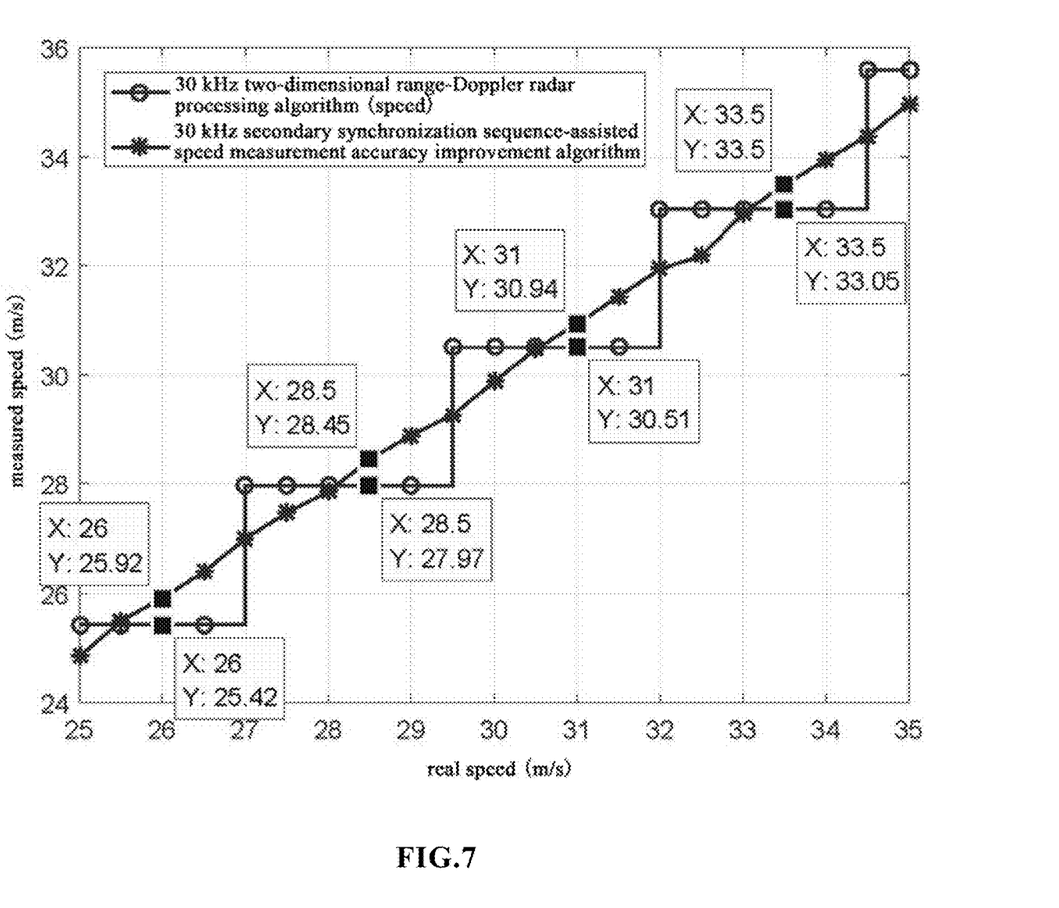
FIG. 7 is a comparison diagram of the speed measurement error when the subcarrier interval is 30 kHz in a test of the invention.

Secondly, FIG. 6 and FIG. 7 respectively show the simulation test results of the primary synchronization sequence-assisted ranging accuracy improvement algorithm module and the secondary synchronization sequence-assisted speed measurement accuracy improvement algorithm module based on the 5G NR synchronization broadcast block in the present invention compared with the ranging/speed measurement of existing two-dimensional range-Doppler radar processing algorithm under 30 kHz subcarrier interval. In simulation, the system of the present invention executes integrated sensing and communication signal processing flow based on 5G NR standard as shown in FIG. 3, and the existing two-dimensional range-Doppler radar processing algorithm executes the signal processing flow as shown in FIG. 2. As can be seen from both FIG. 6 and FIG. 7, the ranging/speed measurement curves of the existing two-dimensional range-Doppler radar processing algorithms all present a stepped changing trend, while the ranging curve processed by the primary synchronization sequence-assisted ranging accuracy improvement algorithm and the speed measurement curve processed by the secondary synchronization sequence-assisted speed measurement accuracy improvement algorithm all show an approximate linear pattern. This shows that compared with the existing two-dimensional range-Doppler radar processing algorithm, the sensing performance of integrated signal improvement algorithm based on the 5G NR synchronization broadcast block used by the system of the invention has smaller measurement error, and the system of the invention can effectively improve the ranging/speed measurement performance.

To sum up, the invention combines the integrated sensing and communication signal design with the current 5G NR standard, links the signal processing with the OFDM communication processing flow, embeds the synchronization sequence in the original transmission sequence and utilizes the autocorrelation characteristics of the sequence, thus effectively improves the sensing accuracy of the existing two-dimensional range-Doppler radar processing algorithm. By combining the 5G NR standard, the invention is carried out within the 5G framework, which is beneficial to the rapid landing and implementation of signal design and related algorithms in the system based on the prior art. At the same time, the invention can replace some radar functions with communication signals without changing the communication transmission performance, and has certain engineering practice value.

The invention claimed is:

1. An integrated sensing and communication system based on a mobile communication signal, wherein the following modules are newly added to a sending end and a receiving end of each node in the system, which comprise:
a synchronization sequence embedding module provided at the sending end, which is configured for embedding a primary synchronization sequence and a secondary synchronization sequence into a radio frequency signal to be sent and then outputting the radio frequency signal to a digital modulation module, wherein, the synchronization sequence embedding module embeds a same primary synchronization sequence into a second CP-OFDM symbol and an eighth CP-OFDM symbol of one subframe, and embeds a same secondary synchronization sequence into a fourth CP-OFDM symbol and a tenth CP-OFDM symbol of one subframe; and CP-OFDM represents variable cyclic prefix orthogonal frequency division multiplexing;
a primary synchronization sequence-assisted ranging accuracy improvement algorithm module and a secondary synchronization sequence-assisted speed measurement accuracy improvement algorithm module provided at the receiving end, wherein a receiving sequence output by a parallel-to-serial conversion module at the receiving end is input into a two-dimensional range-Doppler radar processing algorithm module, the primary synchronization sequence-assisted ranging accuracy improvement algorithm module and the secondary synchronization sequence-assisted speed measurement accuracy improvement algorithm module respectively; and wherein the primary synchronization sequence-assisted ranging accuracy improvement algorithm module compensates for a target node range $Range_{OFDM}$ output by the two-dimensional range-Doppler radar processing algorithm module, and the secondary synchronization sequence-assisted speed measurement accuracy improvement algorithm module compensates for a target node speed $V_{OFDM}$ output by the two-dimensional range-Doppler radar processing algorithm module;
wherein the primary synchronization sequence-assisted ranging accuracy improvement algorithm module performs the following operations for N adjacent subframes in the receiving sequence respectively: performing an autocorrelation operation on a subframe in the receiving sequence and a corresponding subframe in a local sequence to calculate a corresponding target node range, where N≥2; calculating an average value of differences between the calculated N target node ranges $Range_u$ and the $Range_{OFDM}$ to obtain a compensation amount for ranging error ΔRange; compensating for the $Range_{OFDM}$; where u=1,2, . . . N;
wherein the secondary synchronization sequence-assisted speed measurement accuracy improvement algorithm module performs the following operations for M adjacent subframes in the receiving sequence respectively: performing a correlation operation on a fourth CP-OFDM symbol and a tenth CP-OFDM symbol in a subframe to obtain a correlation result; obtaining a Doppler frequency shift $Doppler_v$ of a target node from the correlation result, where v=1,2, . . . M, M≥2; calculating a Doppler frequency shift $Doppler_{OFDM}$ according to the target node speed $V_{OFDM}$ output by the two-dimensional range-Doppler radar processing algorithm module, and then calculating an average value of differences between M Doppler frequency shifts $Doppler_v$ and the $Doppler_{OFDM}$ to obtain a compensation amount for Doppler frequency shift error ΔDoppler; compensating for the $Doppler_{OFDM}$; and calculating a compensated target node speed according to the compensated Doppler frequency shift.

2. The system according to claim 1, wherein the primary synchronization sequence consists of an m-sequence with a period of 127 bits, and the secondary synchronization sequence consists of a Gold sequence generated by two m-sequence optimum pairs each with a period of 127 bits.

3. The system according to claim 1, wherein the sending end sets a subcarrier interval according to range accuracy and speed accuracy required for measurement; a maximum ranging, range resolution, speed resolution and transmission rate corresponding to different subcarrier intervals are as follows, wherein the transmission rate is a transmission rate when a modulation mode is 256QAM, and QAM represents quadrature amplitude modulation;
(1) when the subcarrier interval is 15 kHz, the maximum ranging is 700 m, the range resolution is 7.5 m, the speed resolution is 2.54 m/s, and the transmission rate is 149 Mbit/s;
(2) when the subcarrier interval is 30 kHz, the maximum ranging is 350 m, the range resolution is 3.75 m, the speed resolution is 2.54 m/s, and the transmission rate is 298 Mbit/s;
(3) when the subcarrier interval is 60 kHz, the maximum ranging is 175 m, the range resolution is 1.5 m, the speed resolution is 2.54 m/s and the transmission rate is 746 Mbit/s;

(4) when the subcarrier interval is 60 kHz (extended), the maximum ranging is 200 m, the range resolution is 1.5 m, the speed resolution is 2.54 m/s, and the transmission rate is 640 Mbit/s;

(5) when the subcarrier interval is 120 kHz, the maximum ranging is 85 m, the range resolution is 0.375 m, the speed resolution is 0.627 m/s, and the transmission rate is 2986 Mbit/s;

(6) when the subcarrier interval is 240 kHz, the maximum ranging is 43.5 m, the range resolution is 0.375 m, the speed resolution is 0.627 m/s, and the transmission rate is 2986 Mbit/s.

4. The system according claim 1, wherein the primary synchronization sequence-assisted ranging accuracy improvement algorithm module performs the following operations:

(11) for N adjacent subframes in the receiving sequence respectively, performing an autocorrelation operation on a subframe in the receiving sequence and a subframe with the same primary synchronization sequence in the local sequence to obtain a corresponding time delay and a corresponding target node range $Range_u$, where u=1,2, ... N;

(12) calculating an average value of differences between $Range_u$ and the range $Range_{OFDM}$ outputted by the two-dimensional range-Doppler radar processing algorithm module, as the compensation amount for ranging error $\Delta Range = E(Range_u - Range_{OFDM})$, where u=1,2, ... N;

(13) calculating a real target node range after compensation $Range_{real} = Range_{OFDM} + \Delta Range$.

5. The system according to claim 1, wherein the secondary synchronization sequence-assisted speed measurement accuracy improvement algorithm module performs the following operations:

(21) for M adjacent subframes in the receiving sequence respectively, performing a correlation operation on a fourth CP-OFDM symbol and a tenth CP-OFDM symbol in a subframe to obtain a correlation result $C_{acor}^v$, where v=1,2, ... M;

(22) searching a peak point phase corresponding to each correlation result to calculate a Doppler frequency shift $Doppler_v$ of a target node measured for each subframe, where v=1,2, ... M;

(23) calculating an average value of differences between the Doppler frequency shifts $Doppler_v$ and the $Doppler_{OFDM}$ as the compensation amount for Doppler frequency shift error $\Delta Doppler$;

$\Delta Doppler = E(Doppler_v - Doppler_{OFDM})$, where v=1,2, ... M;

(24) calculating a real Doppler frequency shift of the target node after compensation: $Doppler_{real} = Doppler_{OFDM} + \Delta Doppler$;

(25) calculating a compensated target node speed $$V_{real} = \frac{\lambda_c Doppler_{real}}{2};$$

wherein $\lambda_c$ represents the wavelength of the signal.

6. The system according to claim 1, wherein the synchronous sequence embedding module, the digital modulation module, a serial-to-parallel conversion module, an IFFT module, a cyclic prefix insertion module, a parallel-to-serial conversion module and a digital-to-analog conversion module are provided at the sending end of the node; and an analog-to-digital conversion module, a serial-to-parallel conversion module, a cyclic prefix removal module, an FFT module, a parallel-to-serial conversion module, the two-dimensional range-Doppler radar processing algorithm module, the primary synchronization sequence-assisted ranging accuracy improvement algorithm module, and the secondary synchronization sequence-assisted speed measurement accuracy improvement algorithm module are provided at the receiving end of the node.

7. The system according to claim 3, wherein the primary synchronization sequence-assisted ranging accuracy improvement algorithm module performs the following operations:

(11) for N adjacent subframes in the receiving sequence respectively, performing an autocorrelation operation on a subframe in the receiving sequence and a subframe with the same primary synchronization sequence in the local sequence to obtain a corresponding time delay and a corresponding target node range $Range_u$, where u=1,2, ... N;

(12) calculating an average value of differences between $Range_u$ and the range $Range_{OFDM}$ outputted by the two-dimensional range-Doppler radar processing algorithm module, as the compensation amount for ranging error $\Delta Range = E(Range_u - Range_{OFDM})$, where u=1,2, ... N;

(13) calculating a real target node range after compensation $Range_{real} = Range_{OFDM} + \Delta Range$.

8. The system according to claim 3, wherein the secondary synchronization sequence-assisted speed measurement accuracy improvement algorithm module performs the following operations:

(21) for M adjacent subframes in the receiving sequence respectively, performing a correlation operation on a fourth CP-OFDM symbol and a tenth CP-OFDM symbol in a subframe to obtain a correlation result $C_{acor}^v$, where v=1,2, ... M;

(22) searching a peak point phase corresponding to each correlation result to calculate a Doppler frequency shift $Doppler_v$ of a target node measured for each subframe, where v=1,2, ... M;

(23) calculating an average value of differences between the Doppler frequency shifts $Doppler_v$ and the $Doppler_{OFDM}$ as the compensation amount for Doppler frequency shift error $\Delta Doppler$;

$\Delta Doppler = E(Doppler_v - Doppler_{OFDM})$, where v=1,2, ... M;

(24) calculating a real Doppler frequency shift of the target node after compensation: $Doppler_{real} = Doppler_{OFDM} + \Delta Doppler$;

(25) calculating a compensated target node speed $$V_{real} = \frac{\lambda_c Doppler_{real}}{2};$$

wherein $\lambda_c$ represents the wavelength of the signal.

9. The system according to claim 3, wherein the synchronous sequence embedding module, the digital modulation module, a serial-to-parallel conversion module, an IFFT module, a cyclic prefix insertion module, a parallel-to-serial conversion module and a digital-to-analog conversion module are provided at the sending end of the node; and an analog-to-digital conversion module, a serial-to-parallel conversion module, a cyclic prefix removal module, an FFT module, a parallel-to-serial conversion module, the two-dimensional range-Doppler radar processing algorithm module, the primary synchronization sequence-assisted ranging accuracy improvement algorithm module, and the secondary synchronization sequence-assisted speed measurement accuracy improvement algorithm module are provided at the receiving end of the node.

\* \* \* \* \*